(12) United States Patent
Yamaguchi

(10) Patent No.: US 7,474,336 B2
(45) Date of Patent: Jan. 6, 2009

(54) REMOTE CONTROL APPARATUS OF DIGITAL VIDEO CAMERA

(75) Inventor: Minoru Yamaguchi, Saitama (JP)

(73) Assignee: Heiwa Seiki Kogyo Co., Ltd., Saitama (JP)

( * ) Notice: Subject to any disclaimer, the term of this patent is extended or adjusted under 35 U.S.C. 154(b) by 577 days.

(21) Appl. No.: 11/148,348

(22) Filed: Jun. 9, 2005

(65) Prior Publication Data
US 2006/0038889 A1  Feb. 23, 2006

(30) Foreign Application Priority Data
Aug. 23, 2004 (JP) ............................. 2004-242922

(51) Int. Cl.
*H04N 5/232* (2006.01)
(52) U.S. Cl. .................................................. 348/211.4
(58) Field of Classification Search ........................ None
See application file for complete search history.

(56) References Cited

U.S. PATENT DOCUMENTS 5,068,735 A * 11/1991 Tuchiya et al. ............ 348/211.9
6,526,232 B1 * 2/2003 Mizumura .................... 396/72
6,707,501 B1 * 3/2004 McKay et al. ............... 348/373

OTHER PUBLICATIONS

"Unicord Super-Fuzz Schematic," Amplifier Corp. of America, Jun. 4, 1968.*

* cited by examiner

Primary Examiner—x Ho
Assistant Examiner—Dennis Hogue
(74) Attorney, Agent, or Firm—Wenderoth, Lind & Ponack, L.L.P.

(57) ABSTRACT

A remote control apparatus that is compatible with two types of digital video cameras. The remote control apparatus includes a start and stop switch which operates start and stop, a zoom volume control which operates a zoom, a microcomputer circuit which converts operation signals of the start and stop switch and the zoom volume control into communication signals, and a switch which changes whether the operation signals of the start and stop switch and the zoom volume control are transmitted to the digital video camera without passing through the microcomputer circuit or the communication signal obtained by inputting the operation signal to the microcomputer circuit is transmitted to the digital video camera.

1 Claim, 1 Drawing Sheet

REMOTE CONTROL APPARATUS OF DIGITAL VIDEO CAMERA

BACKGROUND OF THE INVENTION

1. Field of the Invention

The present invention relates to a remote control apparatus of a digital video camera.

2. Description of the Related Art

Currently, depending on digital video camera manufacturers, the remote control of the digital video camera contains both a type called LANC (registered trademark) in which the remote control is performed by a communication signal using a microcomputer circuit (hereinafter referred to as communication control type) and a type in which the remote control is directly performed with a volume control and a switch (hereinafter referred to as direct control type). A remote control apparatus compatible with each type is required (for example, see http://www.honjo-net.co.jp/index_j.html (http://www.honjo-net.co.jp/new/521.521P.htm), http://www.gpatec.com/varizoom, and http://www.hoei.co.jp/japan/product/bebob/).

Therefore, there is a problem that a user who has the digital video cameras produced by different manufacturers or a user who buys a new digital video camera is required to buy plural remote control apparatuses in each control type.

However, a remote control apparatus compatible with any control type described above has not been realized yet, and there is a fervent demand to realize the remote control apparatus compatible with any control type among the users.

SUMMARY OF THE INVENTION

In view of the foregoing, an object of the invention is to provide a remote control apparatus which is solely compatible with the different control types of the digital video cameras depending on the manufacturers.

In order to solve the above problem, a first aspect of a remote control apparatus according to the invention includes a start and stop switch which operates start and stop of the digital video camera; a zoom volume control which operates a zoom of the digital video camera; a microcomputer circuit which converts operation signals of the start and stop switch and the zoom volume control into communication signals; and a switch which changes whether the operation signals of the start and stop switch and the zoom volume control are transmitted to the digital video camera without passing through the microcomputer circuit or the communication signals obtained by inputting the operation signals to the microcomputer circuit are transmitted to the digital video camera.

A second aspect of a remote control apparatus according to the invention includes a start and stop switch which operates start and stop of the digital video camera; a microcomputer circuit which converts an operation signal of the start and stop switch into a communication signal; and a switch which changes whether the operation signal of the start and stop switch is transmitted to the digital video camera without passing through the microcomputer circuit or the communication signal obtained by inputting the operation signal to the microcomputer circuit is transmitted to the digital video camera.

A third aspect of a remote control apparatus according to the invention includes a zoom volume control which operates a zoom of the digital video camera; a microcomputer circuit which converts an operation signal of the zoom volume control into a communication signal; and a switch which changes whether the operation signal of the zoom volume control is transmitted to the digital video camera without passing through the microcomputer circuit or the communication signal obtained by inputting the operation signal to the microcomputer circuit is transmitted to the digital video camera.

According to the first to third aspects of the remote control apparatus of the invention, whether the operation signal is directly transmitted or the communication signal converted by the microcomputer circuit is transmitted can easily be changed by the switch.

Accordingly, the start and stop or the zoom which is operated by the user during the use of the remote control apparatus can be realized by the one remote control apparatus compatible with the two kinds of the digital video cameras, i.e. the direct control type and the communication control type.

DETAILED DESCRIPTION OF THE PREFERRED EMBODIMENTS

Figure 1:
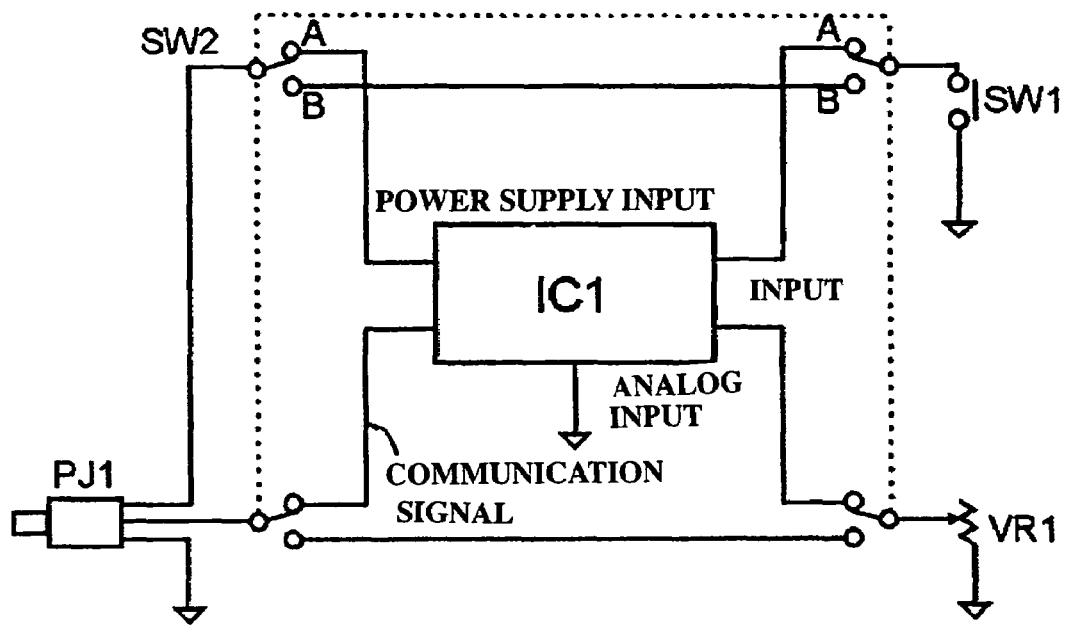
FIG. 1 is a schematic circuit diagram showing an embodiment of the invention.

FIG. 1 is a schematic circuit diagram showing an embodiment of the invention.

In FIG. 1, the symbol SW1 designates a start and stop switch which operates the start and stop of the reproduction, the picture recording, and the like of a digital video camera (hereinafter referred to as DV camera). The symbol VR1 designates a zoom volume control which operates a digital signal or an optical zoom in the DV camera. For example, the zoom volume control may be formed by a variable resistive element. The symbol IC1 designates a microcomputer circuit which converts the operation signals of the start and stop switch SW1 and the zoom volume control VR1 into the communication signals. The symbol SW2 designates a switch which changes whether the operation signals of the start and stop switch SW1 and the zoom volume control VR1 are transmitted to the DV camera without passing through the microcomputer circuit IC1 or the communication signals obtained by inputting the operation signal to the microcomputer circuit IC1 are transmitted to the DV camera. The symbol PJ1 designates a remote connector which is connected to a connector on the DV camera side in a wired manner to transmit each signal to the DV camera.

In the circuit diagram of FIG. 1, when a LANC communication control type DV camera is remotely controlled, by changing the switch SW2 to the A side (FIG. 1), the operation signals of the start and stop switch SW1 and the zoom volume control VR1 are enabled to input while electric power is supplied to the microcomputer circuit IC1. When the user operates the start and stop switch SW1 or the zoom volume control VR1, the signals are inputted to the microcomputer circuit IC1, and the signals are converted into the communication signal indicating the start and stop or the communication signal indicating the zoom of a wide angle W or telephoto T according to an input value. Then, the communication signal is transmitted from the remote connector PJ1 to the DV camera through a connection cable (not shown). For example, the conversion of the volume operation signal into the communication signal is performed by computing a change amount of the operation signal.

On the other hand, when the direct control type DV camera is remotely controlled, by changing the switch SW2 to the B side, the operation signals of the start and stop switch SW1 and the zoom volume control VR1 are transmitted to the remote connector PJ1 without passing through the microcomputer circuit IC1. Then, during the user's operation, the operation signals of the start and stop switch SW1 and the zoom volume control VR1 are directly transmitted from the remote connector PJ1 to the DV camera through the connection cable.

According to the circuit diagram of FIG. 1, the user can remotely control the two types of DV cameras, i.e. the communication control type and direct control type DV cameras only by changing the switch SW2 with one remote control apparatus. Namely, the one remote control apparatus can be used for the two types of DV cameras.

In the embodiment of FIG. 1, the remote control apparatus is provided with both the start and stop switch SW1 and the zoom volume control VR1. However, needless to say, it is also possible to form the remote control apparatus which is provided only with either the start and stop switch SW1 or the zoom volume control VR1 to control either the start and stop or the zoom.

For the remote connector PJ1, it is also possible that the connector dedicated to the direct control type DV camera which directly transmits the operation signal and the connector dedicated to the communication control type DV camera which transmits the communication signal converted by the microcomputer circuit are separately provided.

EXAMPLE

Figure 2:
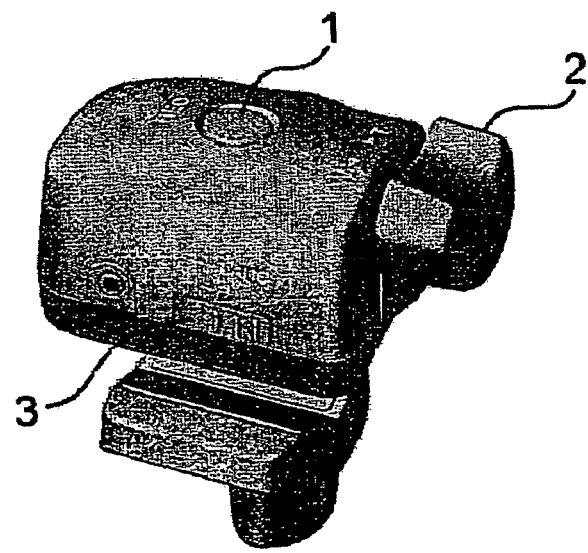
FIG. 2 is a schematic view showing an external appearance of an example of the invention.

FIG. 2 is a schematic view showing an external appearance of an example of the remote control apparatus according to the invention, which is provided with the above circuit configuration.

In FIG. 2, the numeral 1 designates a start and stop operation unit corresponding to the start and stop switch SW1, the numeral 2 designates a zoom operation unit corresponding to the zoom volume control VR1, and the numeral 3 designates a switch operation unit corresponding to the switch SW2.

Thus, an integral type apparatus, in which a board having the above circuit configuration is incorporated into a chassis and the operation units 1 to 3 are appropriately arranged, can be realized. Therefore, the DV cameras having the two control types can remotely be controlled by the one compact and inexpensive remote control apparatus.

What is claimed is:

1. A remote control apparatus for a digital video camera comprising:
    a start and stop switch which operates start and stop of the digital video camera;
    a zoom volume control which operates a zoom of the digital video camera;
    a microcomputer circuit which converts operation signals of said start and stop switch and said zoom volume control into communication signals; and
    a switch which changes whether the operation signals of the start and stop switch and said zoom volume control are transmitted to the digital video camera without passing through said microcomputer circuit or the communication signals obtained by inputting the operation signals to said microcomputer circuit are transmitted to the digital video camera,
    wherein said start and stop switch, said zoom volume control, said microcomputer circuit, and said switch are integrally incorporated in a single housing, the housing being provided with a start and a stop operation unit corresponding to said zoom volume control, a switch operation unit corresponding to said switch, and a remote connector which is connected to a connector of the digital video camera through a connection cable, and
    wherein, when said switch is changed to a first control type side which performs remote control using said microcomputer circuit, electric power is supplied to said microcomputer circuit and the operation signals of said start and stop switch and said zoom control are inputted into said microcomputer circuit so that the operation signals are inputted into said microcomputer circuit by the operation of said start and stop switch or said zoom volume control, and the operation signals are converted into the communication signals and are transmitted to the digital video camera from the remote connector, and when said switch is changed to a second control type side which performs remote control without using said microcomputer circuit, the operation signals of said start and stop switch and said zoom volume control are directly transmitted to the digital video camera from the remote connector such that said remote control device enables use of either of two different types of digital video cameras.

* * * * *